United States Patent [19]

Comensoli

[11] Patent Number: 5,031,311
[45] Date of Patent: Jul. 16, 1991

[54] METHOD FOR EXTRACTING PACKETS OF BLADES FROM A STEAM TURBINE

[75] Inventor: Jean-Claude Comensoli, Gonesse, France

[73] Assignee: Alsthom, Paris, France

[21] Appl. No.: 346,682

[22] Filed: May 3, 1989

[30] Foreign Application Priority Data

May 3, 1988 [FR] France ................. 88 05927

[51] Int. Cl.⁵ ............................................ B23P 19/04
[52] U.S. Cl. .................................. 29/889.1; 29/426.4; 29/426.5
[58] Field of Search ................. 29/426.1, 426.2, 426.3, 29/426.4, 426.5, 248, 252, 33.52, 564.3, 598, 825, 889.1; 254/18

[56] References Cited

U.S. PATENT DOCUMENTS

| 2,744,312 | 5/1956 | Conger | 29/426.1 X |
| 4,078,290 | 3/1978 | Fletcher et al. | 29/252 |
| 4,141,124 | 2/1979 | Ryan | 29/252 X |
| 4,279,068 | 7/1981 | Altmayer | 29/252 |
| 4,429,857 | 2/1984 | Ferguson | 254/18 |
| 4,442,593 | 4/1984 | Holmberg | 29/825 |
| 4,451,959 | 6/1984 | Miller et al. | 29/426.4 X |
| 4,455,730 | 6/1984 | Guenther | 29/252 |

FOREIGN PATENT DOCUMENTS 1098960  2/1961  Fed. Rep. of Germany .

Primary Examiner—Mark Rosenbaum
Assistant Examiner—Peter Dungba Vo
Attorney, Agent, or Firm—Sughrue, Mion, Zinn, Macpeak & Seas

[57] ABSTRACT

A method of extracting packets of blades (1) insertable radially into a disk (5) of a steam turbine rotor, for the purpose of being fixed therein. The flat situated above the feet of the blades are clamped and then pulled out radially. Apparatus for performing the method comprises two levers (15) hinged to each other such that moving the rear arms (18) apart causes the front arms (17) fitted with jaws (20) to clamp against the flats of the blades. Actuators (23) move the entire apparatus (14) radially away from the disk (5). The packets of blades (1) are extracted without being damaged and they may be reused after the disk (5) has been repaired.

2 Claims, 4 Drawing Sheets

FIG. 1
FIG. 2
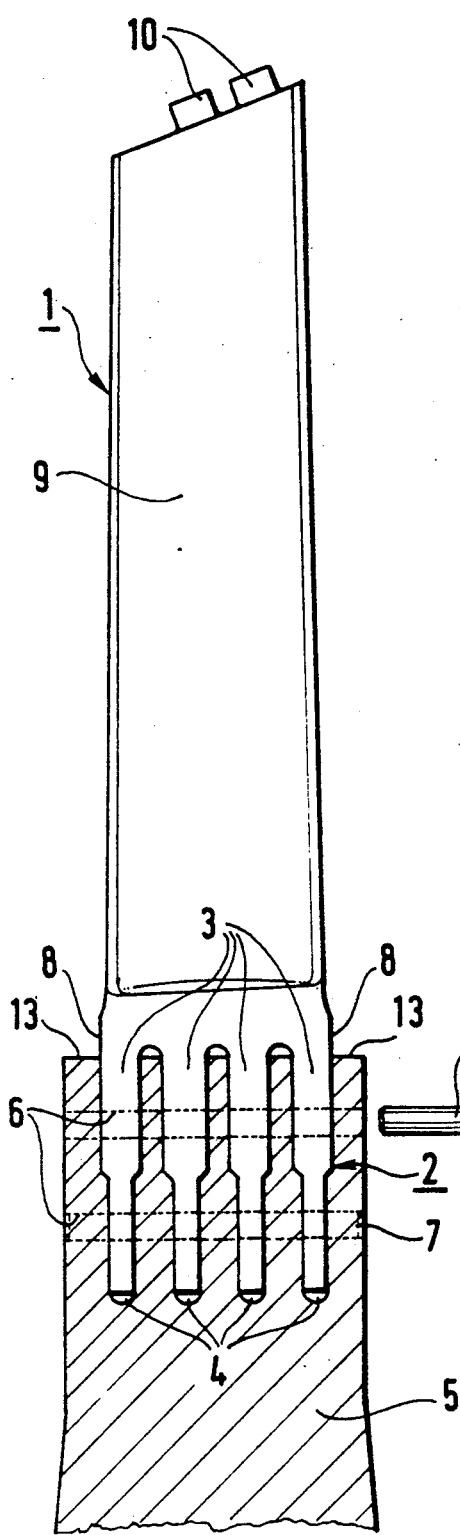
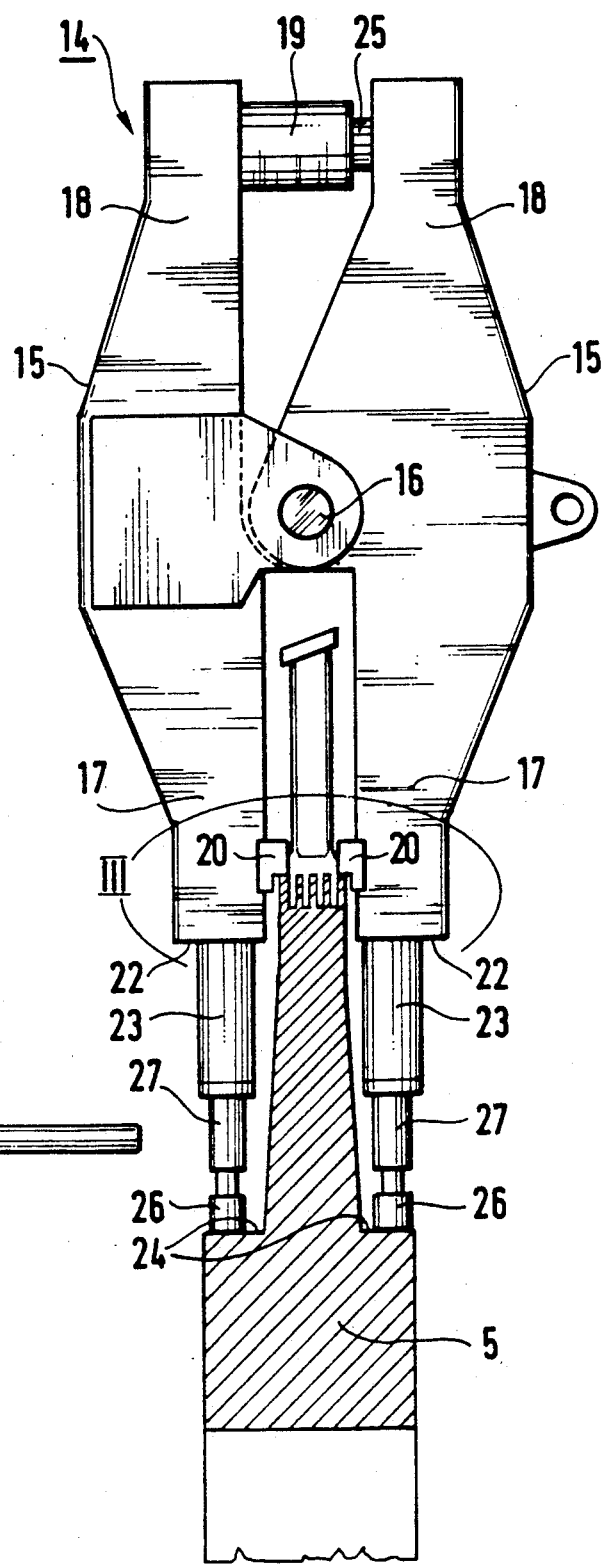

METHOD FOR EXTRACTING PACKETS OF BLADES FROM A STEAM TURBINE

The present invention relates to a method for extracting packets of blades of the type held together by bands, and in which each blade includes a foot for insertion radially into a support disk in order to be fixed to said disk by pegs, and also including a flat above the foot and constituted by faces which are orthogonal to the axis of the disk.

BACKGROUND OF THE INVENTION

Such a method is used for extracting the blades from the disks without damaging them, e.g. when overhauling the rotor of a steam turbine. After the disks of the rotor have been repaired, packets of blades that have not been damaged during extraction can be reused.

Since blades are expensive, it is advantageous to be able to reuse them.

In the prior art, the pegs holding the feet of the blades to the disks are removed. However, because of corrosion, some of the pegs are very difficult to extract from their housings.

The pegs that cannot be extracted are therefore drilled out leaving a small peripheral layer so as to avoid any damage to the walls of the housing which would damage the blades by increasing hole diameters.

Thus, when the packets of blades are extracted, there remains a degree of resistance due to corrosion and to the remaining portions of the pegs.

It is known to clamp onto the vanes of the blades and then to extract a packet by pulling radially on the vanes. However, such vanes are twisted in shape and they are difficult to grasp, which means that the vanes must be clamped very tightly and as a result the blades are often deformed during extraction.

The method of the invention makes it possible to extract the blades without running any risk of deforming the vanes, or of deforming the bands holding together the blades in a packet.

SUMMARY OF THE INVENTION

The present invention provides a method of extracting packets of blades of the type interconnected by bands, each blade comprising a foot insertable radially into a support disk in order to be fixed thereto by pegs, and also comprising a flat above the foot and constituted by faces which are orthogonal to the axis of the disk, the method being such that all or a portion of the pegs are eliminated, wherein the flats of the blades are clamped, after which a packet of blades is extracted radially parallel to the flats by bearing against the disks.

In addition, by bearing against the disk itself, it is possible to extract a packet in a direction which is radial.

It may happen that the flats on the blades in a given packet are not exactly in the same orthogonal planes, and in this case the flats of the various different blades are clamped with substantially the same force so as to avoid any one blade staying in place during a portion of the extraction process and thus damaging the bands.

The present invention also provides for performing the extraction method of the invention. This apparatus is characterized in that it comprises a clamp provided with two levers hinged about a pin, each lever comprising a rear arm and a front arm, the clamp including means for moving the rear arms apart from each other so as to move the front arms towards each other, said front arms including clamping jaws which face each other and which are suitable for clamping to the flats of the blades to be extracted, said front arms also being provided with actuators at their ends enabling the entire apparatus to be moved away from bearing points of the actuators while remaining in a plane perpendicular to the hinge pin.

BRIEF DESCRIPTION OF THE DRAWINGS

An embodiment of the invention is described by way of example with reference to the accompanying drawings, in which:

FIG. 1 is a front view of a blade to be extracted.

FIG. 2 shows an apparatus in accordance with the invention.

DETAILED DESCRIPTION

Figure 3:
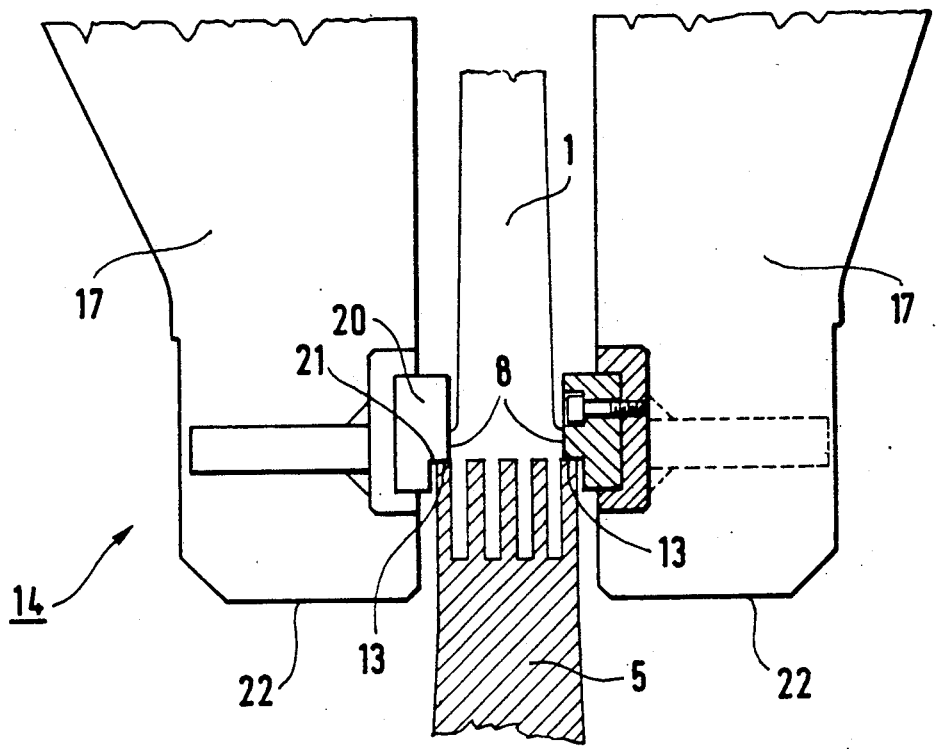
FIG. 3 is a fragmentary section through the front portion of the FIG. 2 apparatus.

The type of blade shown in FIG. 1 is used in some of the stages of a steam turbine. Each blade 1 comprises a foot 2 provided with fingers 3 which can be inserted radially into circumferential grooves 4 in a disk 5.

These fingers are pierced by orifices 6 through which pegs 7 are passed in order to fix the feet 2 to the disk 5.

Above its foot 2, a blade 1 includes a low flat 8 having two plane faces both of which are orthogonal relative to the axis of the disk 5.

Figure 5:
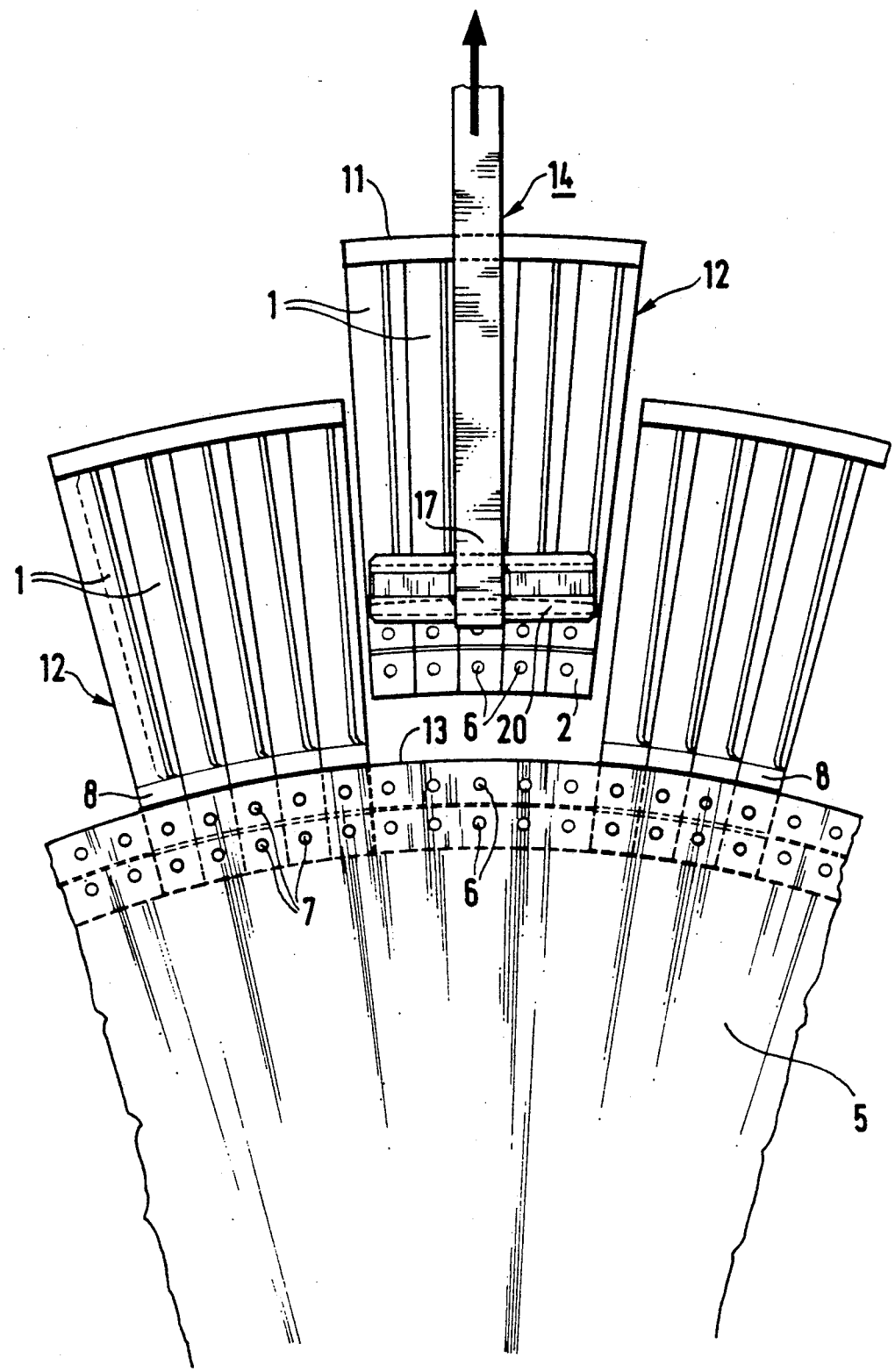
FIG. 5 shows a packet of blades being extracted.

Above the flat 8, each blade 1 includes a twisted vane 9 terminated by studs 10 used for fixing a band 11 interconnecting a plurality of blades 1 in order to form a packet 12 (see FIG. 5).

Figure 4:
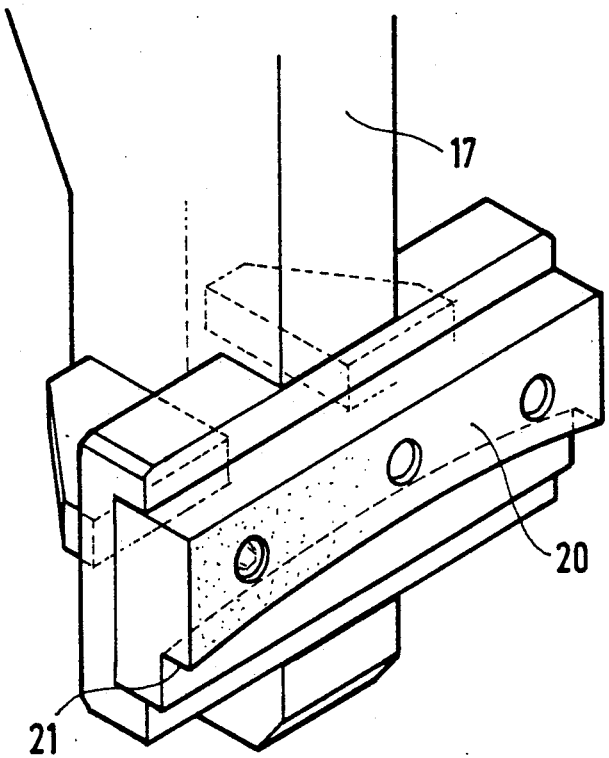
FIG. 4 is a perspective view of a jaw of an apparatus in accordance with the invention.

The apparatus 14 (see FIGS. 2 to 4) for extracting packets 12 of blades comprising two levers 15 hinged about a pin 16. Each lever 15 comprises a front arm 17 and a rear arm 18. An actuator 19 is disposed between the rear arms 18 for moving said arms 18 apart.

Jaws 20 are received in the portions of the front arms 17 constituting facing ends 22. Each of the jaws 20 has a step 21 whose bottom is concave in shape (e.g. a portion of a cylinder, or an obtuse-angled dihedral) which bears against the edge 13 of the disk 5 on either side of the flat 8 on the blades 1.

Radially directed actuators 23 are disposed at the ends 22 of the front arms 17 and bear against the hub 24 of the disk 5.

In order to extract a packet 12 of blades, the pegs 7 holding the feet 2 of the blades 1 in a packet 12 of the disk 5 are removed. If some of the pegs 7 remain jammed in place, they are drilled out in such a manner as to leave a small peripheral layer behind.

The apparatus 14 is then put into position with the jaws 20 placed on the edges 13 of the disk 5 on either side of the flat 8 on the blades 1 to be extracted. The pin 16 is then disposed perpendicular to the axis of the disk 5. The actuator 19 is powered so that its rod 25 moves out and moves apart the rear arms 18, thereby moving the front arms 17 towards each other and clamping them against the flats 8 of the blades 1.

The ends 26 terminating the rods 27 of the end actuator 23 bear against the hub 24 of the disk 13.

The end actuators 23 are powered, thereby extending their rods 27 and moving the apparatus 14 together with its jaws 20 away from the hub 24.

The jaws 20 clamping the flats 8 of the blades 1 exert an extraction force on the blades in a radial direction with the effects of extracting them from the grooves in the disk 5, and of breaking the remains of the pegs 7 still running through the fingers of the feet 2.

The blades 1 are not damaged by the clamping applied to their flats 8. In addition, since all of the blades 1 are extracted exactly radially, an entire packet 12 of blades 1 can be recovered and reused after the disk 5 has been repaired.

Figure 6:
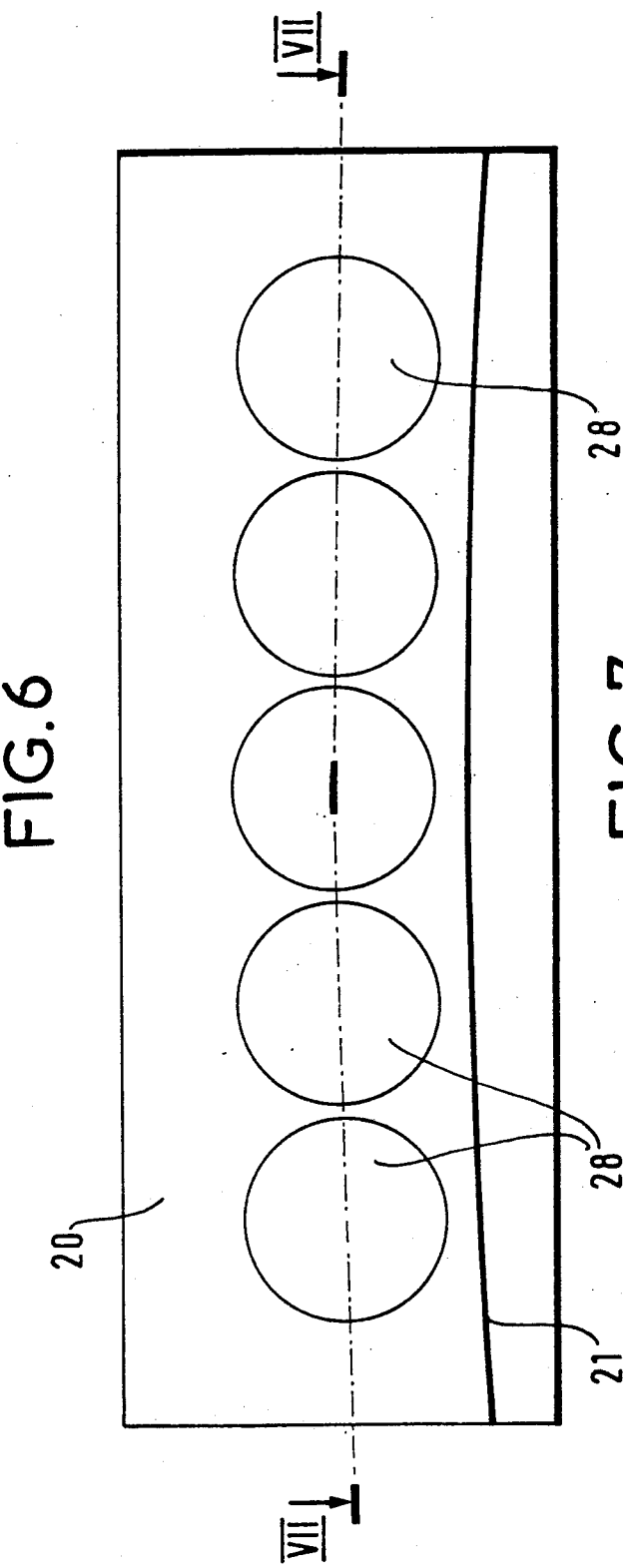
FIGS. 6 and 7 are a front view and a section view through a jaw used in the FIG. 2 apparatus.
Figure 7:
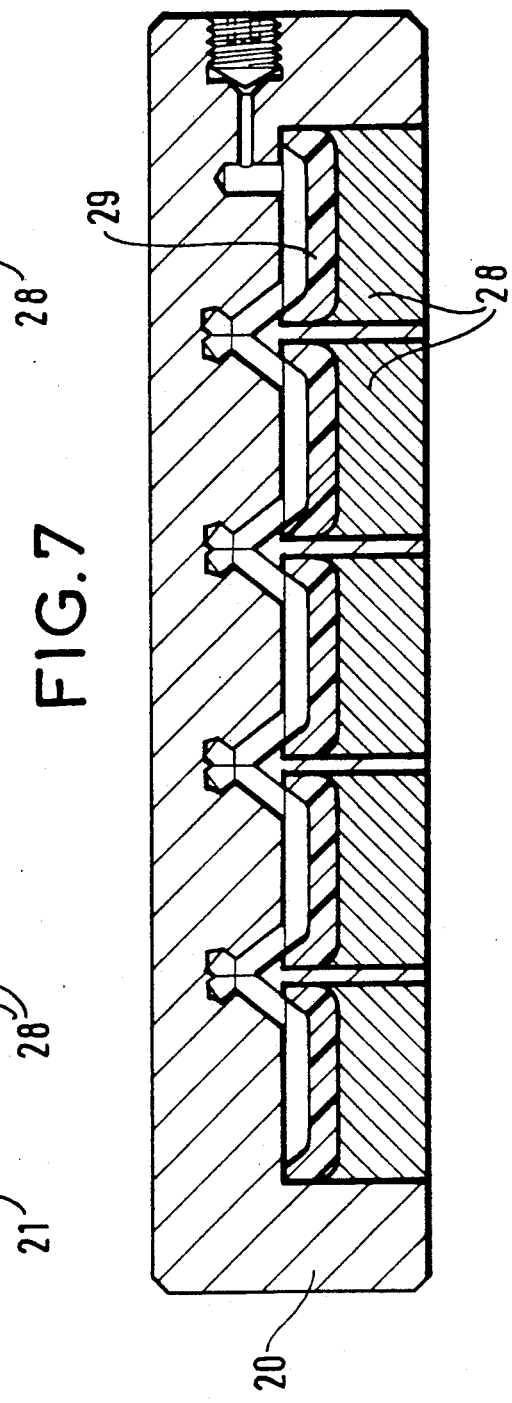

In a variant of the invention shown in FIGS. 6 and 7, each jaw 20 includes a series of pistons 28 provided with gaskets 29 and driven by a common liquid pressure, with there being one piston 18 per flat. A jaw as shown has five pistons 28 and is therefore intended for extracting a packet of five blades.

The apparatus 14 provided with such jaws 20 is capable of exerting the same clamping force on each flat 8 even if the faces of the flats of the blades in a packet do not all lie in exactly the same orthogonal planes but are offset laterally relative to one another.

The same pressure is applied to all of the pistons 28 such that each flat 8 is clamped with the same force, assuming that the entire surface of each piston 28 is pressed on the face of only one flat 8.

The extraction of a packet of blades is thus made more easy.

In FIG. 6, the bottom of the step 21 is shown as being in the form of an obtuse-angled dihedral.

What is claimed is:

1. A method for extracting packets of turbine blades of the type interconnected by bands, each blade comprising a foot forming at least one finger insertable radially into an annular slot within the outer peripheral surface of a support disk in order to be fixed thereto by pegs extending through aligned holes within said support disk and said at least one finger at the level of said slot, and also comprising a flat above the foot and constituted by parallel faces which are orthogonal to the axis of the disk; said method comprising the steps of:

eliminating at least a portion of the pegs, applying a clamping force to opposite faces of the flats of the blades, and applying radial extraction forces on opposite sides of the blades between the clamped flats and said support disk such that a packet of blades is extracted radially parallel to the faces of the flats by said extraction forces bearing radially against the disk.

2. A method according to claim 1, wherein simultaneously the same clamping force is applied to the flats of all of the blades.

* * * * *